US009039960B2

(12) United States Patent
Didomizio et al.

(10) Patent No.: US 9,039,960 B2
(45) Date of Patent: May 26, 2015

(54) METHODS FOR PROCESSING NANOSTRUCTURED FERRITIC ALLOYS, AND ARTICLES PRODUCED THEREBY

(71) Applicant: General Electric Company, Schenectady, NY (US)

(72) Inventors: Richard Didomizio, Amsterdam, NY (US); Matthew Joseph Alinger, Albany, NY (US); Raymond Joseph Stonitsch, Simpsonville, SC (US); Samuel Vinod Thamboo, Latham, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/745,506

(22) Filed: Jan. 18, 2013

(65) Prior Publication Data
US 2013/0129556 A1    May 23, 2013

Related U.S. Application Data

(62) Division of application No. 12/636,976, filed on Dec. 14, 2009, now Pat. No. 8,357,328.

(51) Int. Cl.
| | |
|---|---|
| *B22F 3/15* | (2006.01) |
| *B22F 5/00* | (2006.01) |
| *C22C 33/02* | (2006.01) |
| *C22C 38/02* | (2006.01) |
| *C22C 38/04* | (2006.01) |
| *C22C 38/22* | (2006.01) |
| *C22C 38/28* | (2006.01) |
| *F01D 5/28* | (2006.01) |
| *B22F 3/24* | (2006.01) |

(52) U.S. Cl.
CPC ... *B22F 5/00* (2013.01); *B22F 3/15* (2013.01); *B22F 2003/247* (2013.01); *B22F 2998/10* (2013.01); *C22C 33/0285* (2013.01); *C22C 38/02* (2013.01); *C22C 38/04* (2013.01); *C22C 38/22* (2013.01); *C22C 38/28* (2013.01); *F01D 5/286* (2013.01); *Y02T 50/67* (2013.01); *Y02T 50/671* (2013.01); *F05D 2230/00* (2013.01); *B22F 3/24* (2013.01); *F05D 2230/90* (2013.01); *F05D 2300/502* (2013.01)

(58) Field of Classification Search
CPC .................................. B22F 5/009; B22F 5/04
USPC ........................................ 419/19, 49
See application file for complete search history.

(56) References Cited

U.S. PATENT DOCUMENTS

| | | | |
|---|---|---|---|
| 3,772,090 A | 11/1973 | Allen | |
| 4,075,010 A | 2/1978 | Fischer | |
| 4,340,432 A * | 7/1982 | Hede | 419/42 |
| 4,963,200 A * | 10/1990 | Okuda et al. | 148/325 |
| 5,209,772 A | 5/1993 | Benn | |
| 5,989,491 A * | 11/1999 | Isomoto et al. | 419/19 |
| 6,827,755 B2 * | 12/2004 | Taguchi et al. | 75/236 |
| 6,969,431 B2 * | 11/2005 | Hieber et al. | 148/428 |
| 6,974,506 B2 | 12/2005 | Lambard et al. | |
| 7,273,584 B2 | 9/2007 | Ohtsuka et al. | |
| 7,361,235 B2 | 4/2008 | Ohtsuka et al. | |
| 2003/0116239 A1 | 6/2003 | Lambard | |
| 2005/0084406 A1 | 4/2005 | Ohtsuka et al. | |

FOREIGN PATENT DOCUMENTS

| | | |
|---|---|---|
| CN | 101148738 A | 3/2008 |
| JP | 5295513 A | 8/1977 |
| JP | 0426737 A | 1/1992 |
| JP | 0625804 A | 2/1994 |
| JP | 0734179 A | 2/1995 |
| JP | 09-053141 * | 2/1997 |
| JP | 2000282101 A | 10/2000 |
| JP | 2002285289 A | 10/2002 |

OTHER PUBLICATIONS

Miller, M.K. et al., Characterization of precipitates in MA/ODS ferritic alloys, Journal of Nuclear Materials, vol. 351, Issues 1-3, Jun. 2006, pp. 261-268, ISSN 0022-3115, 10.1016/j.nucmat.2006.02.004 (http://www.sciencedirect.com/science/article/pii/S0022311506000894).

Arikawa et al., "Observation of the One-Dimensional Diffusion of Nanometer-Sized Disclocation Loops", Science, Nov. 9, 2007: vol. 318 No. 5852 p. 956-959.

Ahn et al., "Mechanical Alloying and Properties of ODS Ferritic Steels", Advanced Materials Research, 2007, pp. 696-701, vol. 15-17.

Fleetwood, "Mechanical Alloying—The Development of Strong Alloys", Materials Science and Technology, Dec. 1986, pp. 1176-1182, vol. 2, No. 12.

European Search Report dated Mar. 11, 2011 and Written Opinion.

Alinger et al., "Positron Annihilation Characterization of Nanostructured Ferritic Alloys", Materials Science and Engineering A, vol. 518, pp. 150-157, 2009.

Lui et al., "Formation of Oxides Particcles in Ferritic Steel by Using Gas-Atomized Powder", Journal of Nuclear Materials, vol. 396, pp. 86-93, 2010.

Kazimierzak et al., "Fe Base ODS Alloys With Improved Mechanical Strength", Metal Powder Report, MPR Published Services, Shrewsbury, GB, vol. 45, No. 10, pp. 699-702, Oct. 1, 1990.

(Continued)

*Primary Examiner* — George Wyszomierski
*Assistant Examiner* — Ngoclan T Mai
(74) *Attorney, Agent, or Firm* — Ann M. Agosti

(57) ABSTRACT

A formed article comprising a nanostructured ferritic alloy is provided. Advantageously, the article is not formed via extrusion, and thus, cost savings are provided. Methods are also provided for forming the article, and the articles so produced, exhibit sufficient continuous cycle fatigue crack growth resistance and hold time fatigue crack growth resistance to be utilized as turbomachinery components, and in particular, large, hot section components of a gas or steam turbine engines. In other embodiments, a turbomachinery component comprising an NFA is provided, and in some such embodiments, the turbomachinery component may be extruded.

21 Claims, 1 Drawing Sheet

(56) References Cited

OTHER PUBLICATIONS

Miamo et al., "Effects of Consolidation Temperature, Strength and Microstructure on Fracture Toughness of Nanostructured Ferritic Alloys", Journal of Nuclear Materials, vols. 367-370, pp. 208-212, 2007.

McClintock et al., "Mechanical Properties of Neutron Irradiated Nanostructured Ferritic Alloy 14YWT", Journal of Nuclear Materials, vols. 386-388, pp. 307-311, 2009.

Alinger et al, On the role of alloy composition and processing parameters in nanocluster formation and dispersion strengthening in nanostructured ferritic alloys, Acta Materialia 57 (2009) 392-406, Oct. 22, 2008.

Chinese Office Action issued in connection with corresponding CN Application No. 201010609810.9 on Dec. 13, 2013.

Japanese Office Action issued in connection with corresponding JP Application No. 2010275190 on Sep. 16, 2014.

\* cited by examiner

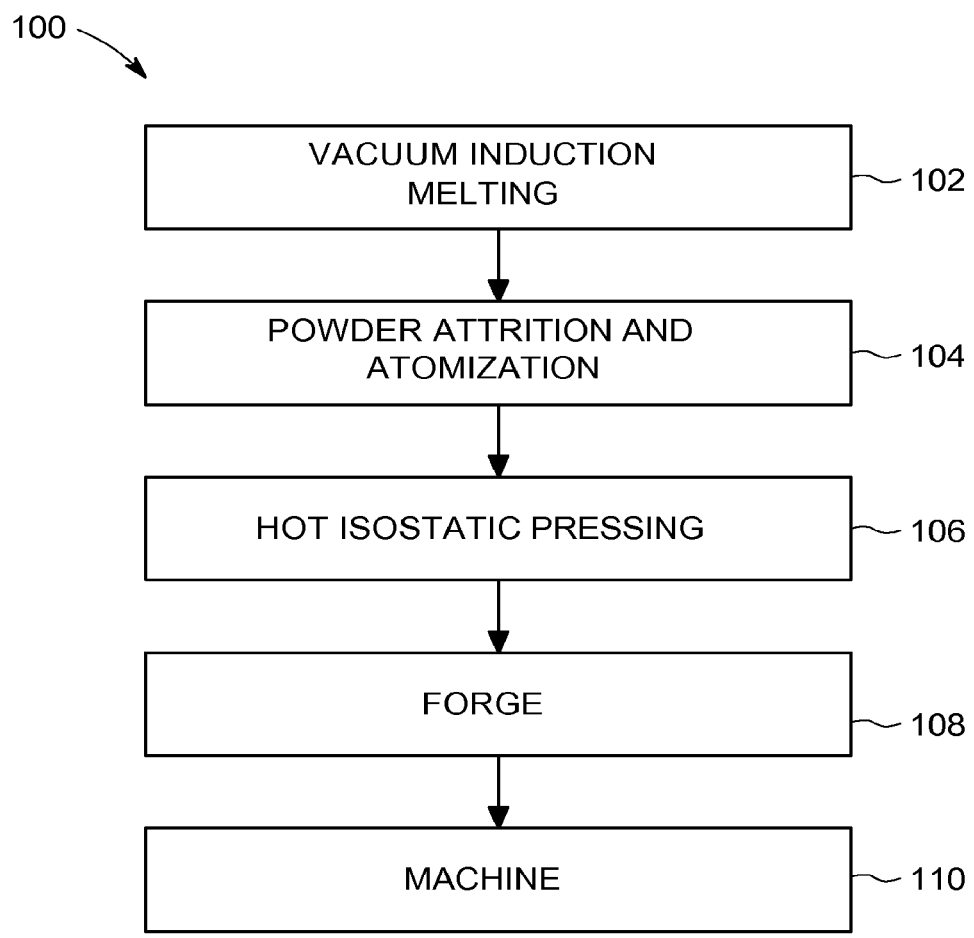

METHODS FOR PROCESSING NANOSTRUCTURED FERRITIC ALLOYS, AND ARTICLES PRODUCED THEREBY

BACKGROUND

The present disclosure relates to nanostructured ferritic alloys (NFAs), and more particularly, methods for processing the same so that articles comprising the NFAs and so processed are suitable for use in challenging environments.

Gas turbines operate in extreme environments, exposing the turbine components, especially those in the turbine hot section, to high operating temperatures and stresses. In order for the turbine components to endure these conditions, they are necessarily manufactured from a material capable of withstanding these severe conditions. Superalloys have been used in these demanding applications because they maintain their strength at up to 90% of their melting temperature and have excellent environmental resistance. Nickel-based superalloys, in particular, have been used extensively throughout gas turbine engines, e.g., in turbine blade, nozzle, wheel, spacer, disk, spool, blisk, and shroud applications. However, designs for improved gas turbine performance require alloys with even higher temperature capability.

Nickel base superalloys used in heavy-duty turbine components require specific processing steps in order to achieve the desired mechanical properties. This process, referred to as a cast and wrought (C&W) approach begins with three melting operations: vacuum induction melting (VIM), electroslag remelting (ESR), and vacuum arc remelting (VAR). The initial VIM operation mixes the elements together forming the alloy of interest; however, significant impurities and macro scale chemical segregation are present. The subsequent ESR and VAR steps are required to produce a chemically pure, homogeneous ingot. The grains of the resulting VAR ingot are too coarse to yield the necessary mechanical properties. As a result, the ingot is broken down via a double upset and draw operation resulting in the recrystallization and refinement of the nickel base superalloy structure. Finally the billet is forged and machined into its final desired shape.

Nanostructured ferritic alloys (NFAs) are an emerging class of alloys that exhibit exceptional high temperature properties, thought to be derived from nanometer-sized oxide clusters that precipitate during hot consolidation following a mechanical alloying step. These oxide clusters are present to high temperatures, providing a strong, stable, microstructure during service. Unlike many nickel base superalloys that require the C&W process to be followed to obtain necessary properties, NFAs are manufactured via a different processing route. Like the C&W process, the alloy chemistry is created via a VIM operation. However, following the initial melting, the NFA is atomized and collected as solid powder particles. These powder particles are then combined with an oxide additive and milled in the presence of steel shot until the oxide addition dissolves in the metal matrix. The ESR and VAR steps are not required.

In order for any material to be optimally useful in, e.g., large hot section components of heavy duty turbo machinery, it may also desirably exhibit both an acceptable continuous cycle fatigue crack growth rate as well as an acceptable hold time fatigue crack growth rate. Such a material may also desirably be utilized for smaller turbomachinery components, e.g., discs for use in jet engines, which likely have a different set of desired or required properties. Any such alloy will also desirably be capable of being manufactured into the desired article utilizing a less energy intensive and/or time consuming process, than the conventional cast and wrought process.

BRIEF DESCRIPTION

In one aspect, there is provided a formed article comprising a nanostructured ferritic alloy, wherein the article is not formed via extrusion.

A turbomachinery component comprising a nanostructured ferritic alloy is also provided.

In another aspect, a method of forming a turbomachinery component comprising a nanostructured ferritic alloy is provided. The method does not comprise extrusion.

In yet another aspect a method of forming a turbomachinery component comprising a nanostructured ferritic alloy is provided. The method comprises melting the nanostructured ferritic alloy via vacuum induction melting, atomizing the nanostructured ferritic alloy melt, sieving the atomized powder, milling the atomized powder in the presence of an oxide until the oxide is dissolved into the metal matrix, and canning and hot isostatic pressing the powder under an inert environment.

DRAWINGS

These and other features, aspects, and advantages of the present invention will become better understood when the following detailed description is read with reference to the accompanying drawings in which like characters represent like parts throughout the drawings, wherein FIG. 1 is a schematic illustration of one embodiment of the method provided herein.

DETAILED DESCRIPTION

Unless defined otherwise, technical and scientific terms used herein have the same meaning as is commonly understood by one of skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation. If ranges are disclosed, the endpoints of all ranges directed to the same component or property are inclusive and independently combinable (e.g., ranges of "up to about 25 wt. %, or, more specifically, about 5 wt. % to about 20 wt. %," is inclusive of the endpoints and all intermediate values of the ranges of "about 5 wt. % to about 25 wt. %," etc.). The modifier "about" used in connection with a quantity is inclusive of the stated value and has the meaning dictated by the context (e.g., includes the degree of error associated with measurement of the particular quantity).

There are provided herein formed articles comprising a nanostructured ferritic alloy, wherein the article is not formed via extrusion. It has now been surprisingly discovered that formed articles can be made from such alloys without an extrusion step, which is advantageous because extrusion limits the final part geometry size. That is, the extrusion step requires a cross sectional area reduction, which limits the part diameter to a size that precludes articles for use in many applications.

In other embodiments, the present invention includes smaller components that may be formed by extrusion, if desired. For example, components for use in aerospace applications may advantageously be formed from NFAs, in which case, the NFAs may provide the components with properties desirable in such applications, and not achievable with conventional nickel-based alloys.

Whether formed by extrusion, hot isostatic pressing, hot isostatic pressing and forging, or roll compaction, the formed articles comprise at least one nanostructured ferritic alloy (NFA). NFAs are an emerging class of alloys comprised of a stainless steel matrix that is dispersion strengthened by a very high density, i.e., at least about $10^{18}$ m$^{-3}$, or at least about $10^{20}$ m$^{-3}$, or even at least about $10^{22}$ m$^{-3}$ of nm-scale, i.e., from about 1 nm to about 100 nm, or from about 1 nm to about 50 nm, or from about 1 nm to about 10 nm, nanofeatures (NFs) comprising Ti—O and at least one other element from the oxide used to prepare the NFA or the alloy matrix. For example, yttrium oxide, aluminum oxide, zirconium oxide, hafnium oxide may be used to prepare the NFA, in which case, the nanofeatures may comprise yttrium (Y), aluminum (Al), zirconium (Z), hafnium (Hf) or combinations of these. Transition metals, such as Fe, Cr, Mo, W, Mn, Si, Nb, Al, Ni, or Ta from the alloy matrix can also participate in the creation of the nanofeatures.

In contrast, conventional oxide dispersion strengthened (ODS) alloys generally contain refined, but larger, equilibrium oxide phases, and, the oxide additive is stable throughout the powder metallurgy process, i.e., if yttrium oxide were added to the matrix alloy, yttrium oxide would be present after the alloying step and there would be no significant formation of the nanofeatures (NFs) described above. In an NFA, the majority, if not substantially all, of the added oxide is dissolved into the alloy matrix during powder attrition and participates in the formation of the aforementioned nanofeatures when the powder is raised in temperature during the compaction process. As described above, the new oxide in the NFA may comprise the transition metals present in the base alloy as well as the metallic element(s) of the initial oxide addition.

While the NFA stainless steel matrix is most often a ferritic stainless steel; martensitic, duplex, and austenitic stainless steels are also potential matrix alloys. Altering the steel matrix phase may allow for improved control over environmental resistance and material ductility.

Any NFA can be formed into the disclosed article. Desirably, the NFA may comprise chromium. Chromium can be important for ensuring corrosion resistance, and may thus be included in the NFA in amounts of at least about 5 wt %, or at least about 9 wt %. Amounts of up to about 30 wt % or up to about 20 wt % or up to about 14 wt % can be included. Advantageously, both chromium and iron, the basis of the NFA, are readily available and relatively low in cost, in particular as compared to nickel-based superalloys which the NFAs may replace in some applications.

The NFA may also desirably include amounts of titanium. Titanium may participate in the formation of the precipitated oxide, and so, amounts of titanium of from about 0.1 wt % to about 2 wt %, or from about 0.1 wt % to about 1 wt % or from about 0.1 wt % to about 0.5 wt %, are desirably included in the NFA.

The NFA further desirably comprises the nanofeatures described above, in number densities of at least about $10^{18}$ m$^{-3}$, or at least about $10^{20}$ m$^{-3}$, or even at least about $10^{22}$ m$^{-3}$. The composition of the nanofeature(s) will depend upon the oxide utilized to prepare the NFA and/or the alloy matrix. Typically, the nanofeatures comprise Ti—O and at least one of Y, Al, Zr, Hf, Fe, Cr, Mo, W, Mn, Si, Nb, Al, Ni, or Ta.

One exemplary NFA suitable for use in the formation of the article may comprise from about 5 wt % to about 30 wt % chromium, from about 0.1 wt % to about 2 wt % titanium, from about 0 wt % to about 5 wt % molybdenum, from about 0 wt % to about 5 wt % tungsten, from about 0 wt % to about 5 wt % manganese, from about 0 wt % to about 5 wt % silicon, from about 0 wt % to about 2 wt % niobium, from about 0 wt % to about 2 wt % aluminum, from about 0 wt % to about 8 wt % nickel, from about 0 wt % to about 2 wt % tantalum, from about 0 wt % to about 0.5 wt % carbon, and from about 0 wt % to about 0.5 wt % nitrogen, with the balance being iron and incidental impurities; and a number density of at least about $10^{18}$ m$^{-3}$ nanofeatures comprising Ti—O and at least one element from the oxide added during preparation of the NFA or from the alloy matrix In other embodiments, the NFA may comprise from about 9 wt % to about 20 wt % chromium, from about 0.1 wt % to about 1 wt % titanium, from about 0 wt % to about 4 wt % molybdenum, from about 0 wt % to about 4 wt % tungsten, from about 0 wt % to about 2.5 wt % manganese, from about 0 wt % to about 2.5 wt % silicon, from about 0 wt % to about 1 wt % niobium, from about 0 wt % to about 1 wt % aluminum, from about 0 wt % to about 4 wt % nickel, from about 0 wt % to about 1 wt % tantalum, from about 0 wt % to about 0.2 wt % carbon, and from about 0 wt % to about 0.2 wt % nitrogen, with the balance being iron and incidental impurities; and a number density of at least about $10^{20}$ m$^{-3}$ nanofeatures comprising Ti—O and at least one element from the oxide added during preparation of the NFA or from the alloy matrix.

In yet other embodiments, the NFA may comprise from about 9 wt % to about 14 wt % chromium, from about 0.1 wt % to about 0.5 wt % titanium, from about 0 wt % to about 3 wt % molybdenum, from about 0 wt % to about 3 wt % tungsten, from about 0 wt % to about 1 wt % manganese, from about 0 wt % to about 1 wt % silicon, from about 0 wt % to about 0.5 wt % niobium, from about 0 wt % to about 0.5 wt % aluminum, from about 0 wt % to about 2 wt % nickel, from about 0 wt % to about 0.5 wt % tantalum, from about 0 wt % to about 0.1 wt % carbon, and from about 0 wt % to about 0.1 wt % nitrogen, with the balance being iron and incidental impurities; wherein the NFA comprises a number density of at least about $10^{22}$ m$^{-3}$ nanofeatures comprising Ti—O and at least one element from the oxide added during preparation of the NFA or from the alloy matrix.

The formed article may be any article desirably comprising the properties conferred thereto by the NFA. One exemplary class of articles that may find particular benefit from application of the principles described herein comprises turbomachinery components, and in particular, those that experience high temperatures during use.

Nickel-based superalloys strengthened with a gamma prime or gamma double prime phase have conventionally been used in these applications. For example, heavy duty turbine wheels strengthened with gamma double prime currently see maximum operating temperatures in the range of 1000° F. to 1100° F. However, as the temperature is increased above 1100° F., the hold time crack growth resistance of many gamma double prime strengthened nickel-based superalloys does not meet design requirements for heavy duty turbine wheels. As a result, efficiency gains and $CO_2$ reductions that can only be realized by higher operating temperatures are not achievable due to nickel-based superalloy material property limitations.

And so, in some embodiments, the formed article may advantageously comprise a large, hot section component of a heavy duty gas turbine or steam turbine. Such articles, and wheels and spacers in particular, are typically in excess of 60 inches or more in diameter and cannot be formed via extrusion.

In such embodiments, i.e., wherein the formed article comprises a heavy duty turbine wheel to be manufactured from a single alloy via hot isostatic pressing, hot isostatic pressing and forging or roll compaction, the alloy used needs to be able to withstand varying conditions based on the position within the wheel. When the rim is operating in excess of 1100° F., the bore can be operating at temperatures up to 900° F. At this temperature, the alloy must be capable of withstanding tensile stresses of approximately 120 ksi, importantly while also exhibiting sufficient fatigue crack growth resistance in all locations.

It has now been surprisingly discovered that NFAs can be utilized in such applications, and can provide the desired and/or required rim and bore properties. More specifically, the article comprising the NFA can exhibit a continuous cycle fatigue crack growth rate at 1000° F. at a stress intensity factor (k) of 45 ksi*in$^{0.5}$ of less than about $1.20\,E^{-4}$ in/cycle, or even less than about $9.03\,E^{-5}$ in/cycle, as measured by ASTM E647. And, the article comprising the NFA can exhibit hold time fatigue crack growth rate at 1000° F. at a k of 45 ksi*in$^{0.5}$ of less than about $1.80\,E^{-3}$ in/hr, or even less than about $1.35\,E^{-3}$ in/hr, as measured by ASTM E1457.

Advantageously, the articles described are not formed via conventional cast and wrought processes, and so, time savings are provided. In some embodiments, the articles are not formed via a process comprising extrusion, and so, the final part size is not particularly limited. In other embodiments, such as aerospace turbine applications, wherein the components requiring the properties that can be provided by an NFA may typically be smaller than those used in heavy duty turbine applications, the components may advantageously be extruded.

In those embodiments wherein the articles are formed without extrusion, the articles provided herein can be formed by first melting the NFA via vacuum induction melting (VIM). Vacuum induction melting results in all elemental species being melted and mixed together, forming the alloy of interest. To do so, the elements of interest are charged into a vacuum induction melting furnace and heated until the mixture becomes molten. The conditions required to do so will depend upon the elements desirably utilized, and those of skill in the art will be readily able to determine the same.

A bottom pore vacuum induction melting system may be used, so that the molten metal falls through an inert gas atomizer. The atomizer may utilize any inert gas, but most often Ar, N, or He is used. In some embodiments, argon is utilized. This gas atomizer generates powder particles that cool in flight and are collected once they are completely solid and/or frozen. Other methods of atomization that can be used to produce the powder include water atomization, rotating electrode atomization, or combinations thereof.

While still under cover of inert gas, the atomized powder is then sieved to a final powder cut. Typically, such powder cuts are made in order to reduce the particle size distribution, to improve packing densities and remove any large impurities. The powder is transferred to an attrition vessel while continuing to maintain inert gas coverage. In addition to the atomized powder, the desired oxide and steel shot is added to the attrition vessel. Any oxide may be utilized in any amount, although typically, yttrium oxide, alumina oxide, zirconium oxide, hafnium oxide are utilized in amounts of 1 wt % or less, based upon the total weight of the NFA. The steel shot, typically 5 mm, is added such that the shot to powder ratio is about 10:1 by mass. The powders are then milled until the desired oxide has been dissolved into the metal matrix. The milling time may vary based upon the oxide selected, and may typically be greater than 10 hours.

The powder is unloaded from the attritor under inert gas coverage and the steel shot is removed. Once the steel shot is removed, the powder is loaded into a container (or can) for hot isostatic pressing (HIP). The can is then evacuated at room temperature, until an acceptable leak back rate is reached. The can is then heated, e.g., to about 550° F. and again evacuated, e.g., until an acceptable leak back rate is reached at temperature.

Once evacuated and sealed, the powder is then consolidated via hot isostatic pressing. More particularly, the can is hot isostatic pressed at the appropriate conditions based upon the NFA desirably consolidated, such conditions typically including a pressure of at least about 20 ksi, or even 30 ksi, at a temperature of at least about 900° C., or 1000° C., or 1100° C., or greater, for at least about 1 hour, or 2 hours, or 3 hours, or 4 hours, or greater. After hot isostatic pressing, the nanostructured ferritic alloy is expected to have a density that is greater than 95% of theoretical density.

In some embodiments, the HIP can may be reheated to a temperature of about 1000° C., or 1100° C., or 1200° C. then transferred to an open die forging press and the height of the can reduced by at least about 30%, or at least about 40%, or at least about 50%. The can is removed from the forging press and re-heated until the entire can is once again at a temperature of about 1000° C., or 1100° C., or 1200° C. The can is then transferred to the open die forging press and is upset, i.e., the height of the can reduced, by at least about 30%, or at least about 40% or at least about 50%, a second time. The forged material is then allowed to air cool. After forging, the nanostructured ferritic alloy has a density that is greater than 98% of theoretical density. Once cool, in some embodiments, the present articles may be machined from the forging to provide the desired article.

Alternatively, the article may be formed via roll compaction. In such embodiments, once the steel balls have been removed following milling, and the powder sieved, if desired, the powder may be fed into a rolling mill where the powder is compacted into sheets. The sheets of metal may then be sintered to create a dense body. In some embodiments, the sintered sheet may then be subjected to multiple rolling and sintering operations.

FIG. 1 schematically illustrates one embodiment of the method provided. More particularly, method 100 comprises a first step 102 of vacuum induction melting of the elements of the NFA. The elements of interest are charged into a vacuum induction melting furnace and heated until the mixture becomes molten. A bottom pore vacuum induction melting system may be used, so that the molten metal falls through an inert gas atomizer.

In a second step 104, the molten metal is subjected to powder atomization and attrition. The atomization step generates powder particles that cool in flight and are collected once they are solid. The atomized powder is then sieved, or attrited, at step 106 [more detail here, and in particular, about the powder cuts] and the sieved powder milled in the presence of an oxide until the oxide is dissolved into the metal matrix.

The powder is then loaded into a container, evacuated, and then consolidated via hot isostatic pressing at step 108. After hot isostatic pressing, the nanostructured ferritic alloy is expected to have a density that is greater than 95% of theoretical density. Alternatively, the powder may be consolidated using roll compaction, as described above.

The resulting consolidated billet is then optionally forged at step 110 and machined at step 112. After forging, the nanostructured ferritic alloy may have a density that is greater than 98% of theoretical density.

The following examples, which are meant to be exemplary and non-limiting, illustrate compositions and methods of manufacturing some of the various embodiments of articles comprising some embodiments of the NFAs provided herein.

EXAMPLE 1

A vacuum induction melting furnace is charged with the following composition: Fe-14Cr-0.4Ti-3W-0.5Mn-0.5Si (wt %). Once the alloy is molten and well mixed, it is atomized via argon gas. While still under inert gas coverage, the powder is sieved to a final cut size of +325/−100 and sealed in a container. The powder is transferred to an attrition vessel while continuing to maintain inert gas coverage. In addition to the atomized powder, 0.25 weight percent of yttrium oxide and 5 mm steel shot is added to the attrition vessel. The steel shot is added such that the shot to powder ratio is 10:1 by mass. The powders are then milled for approximately 12 hours or until the yttrium oxide has been dissolved into the metal matrix. The powder is unloaded from the attritor under inert gas coverage and the steel shot is removed. Once the steel shot is removed, the powder is loaded into a container (or can) for hot isostatic pressing (HIP). The can is then evacuated at room temperature until a leak back rate of 15 microns/hour or better is reached. The can is then heated to 300° C. and evacuated until a leak back rate of 15 microns/hour or better is reached at temperature. Once evacuated and sealed, the HIP can is then HIP'd at 30 ksi for 4 hours at a temperature of 1150° C.

Following HIP'ing, the still canned material is heated in a furnace with flowing argon to a temperature of 1150° C. The can is transferred to an open die forging press and the height is reduced by 50% at a displacement rate of 1 in/min. The can is removed from the forging press and re-heated in a furnace for one hour or until the entire can is once again at a temperature of 1150° C. The can is then transferred to the open die forging press and is upset by 50% a second time at a displacement rate of 1 in/min. The forged material is then allowed to air cool.

Once cool, mechanical test specimens are machined from the forging. In particular, compact tension C(T) specimens are machined out in a R-C orientation. The C(T) specimens conform to the geometry specified in ASTM E647, appendix A1. Cyclic crack growth rate tests are performed in accordance with ASTM E647 and creep crack growth rate tests are performed in accordance with ASTM E1457.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of forming a turbomachinery component comprising a nanostructured ferritic alloy, the method comprising the steps:
forming a melt of an Fe—Ti—Cr alloy, processing the melt to form a powder of the alloy, milling the powder in the presence of an oxide to dissolve the oxide into the alloy to form a milled powder, wherein the oxide is yttrium oxide or yttrium oxide in combination with aluminum oxide and/or hafnium oxide;
hot isostatic pressing the milled powder under an inert environment to form a hot isostatic pressed nanostructured ferritic alloy preform, and
forging the nanostructured ferritic alloy preform into a turbomachinery component wherein the steps are performed in the absence of extrusion,
wherein the hot isostatic pressing is performed in a temperature range of about 900° C. to about 1200° C. for at least about one hour under a pressure of at least about 20 ksi and the inert environment is vacuum to achieve a hot isostatic pressed preform having a thickness and
wherein the forging is performed at a temperature of about 1000° C. to about 1200° C. to reduce the thickness by at least about 30%.

2. The method of claim 1, wherein the powder of the alloy is formed by atomizing wherein the atomizing is performed by at least one of gas atomization, water atomization, rotating electrode atomization, or combinations thereof.

3. The method of claim 1, wherein the Fe—Ti—Cr alloy is martensitic, austenitic, duplex, or ferritic steel.

4. The method of claim 1, wherein the hot isostatic pressing is continued to produce a nanostructured ferritic alloy preform having a density greater than 95% of theoretical density.

5. The method of claim 1, wherein forging of the preform is performed to produce a forged turbomachinery component having a density greater than 98% of theoretical density.

6. The method of claim 5, further comprising machining the forged turbomachinery component.

7. The method of claim 1, wherein the forged turbomachinery component exhibits a continuous cycle fatigue crack growth rate at 1000° F. at a stress intensity factor k of 45 ksi*in$^{0.5}$ of less than about $1.20E^{-4}$ in/cycle.

8. The method of claim 7, wherein the forged turbomachinery component exhibits a continuous cycle fatigue crack growth rate at 1000° F. at a k of 45 ksi*in$^{0.5}$ of less than about $9.03^{-5}$ in/cycle.

9. The method of claim 1, wherein the forged turbomachinery component exhibits a hold time fatigue crack growth rate at 1000° F. at a k of 45 ksi*in$^{0.5}$ of less than about $1.80E^{-3}$ in/hr.

10. The method of claim 9, wherein the forged turbomachinery component exhibits a hold time fatigue crack growth rate at 1000° F. at a k of 45 ksi*in$^{0.5}$ of less than about $1.35E^{-3}$ in/hr.

11. The method of claim 1, wherein yttrium oxide is added to the powder of the alloy and the nanostructured ferritic alloy comprises Fe, Ti, Cr and nanofeatures comprising Ti—O and Y produced by the combination of Ti in the Fe—Ti—Cr alloy with the yttrium oxide added to the powder of the Fe—Ti—Cr alloy.

12. The method of claim 11, wherein yttrium oxide and aluminum oxide are added to the powder of the Fe—Ti—Cr alloy.

13. The method of claim 1 wherein the nanostructured ferritic alloy comprises Fe, Ti, Cr, and incidental impurities and nanofeatures comprising oxides comprised of Ti, O, Y and further comprises at least one of Hf, Fe, Cr, Mo, W, Mn, Si, Nb, Ni or Ta.

14. The method of claim 1 wherein the nanostructured ferritic alloy is dispersion strengthened by nanofeatures comprising Ti—O and Y.

15. The method of claim 1 wherein the nanostructured ferritic alloy is dispersion strengthened by nanofeatures comprising Ti—O and Y and at least one of Hf, Fe, Cr, Mo, W, Mn, Si, Nb, Ni or Ta.

16. The method of claim 1 wherein the forging is performed to reduce the thickness by at least about 40%.

17. The method of claim 1 wherein the forging is performed to reduce the thickness by at least about 50%.

18. The method of claim 1 wherein the nanostructured ferritic alloy comprises Fe, Ti, Cr, and incidental impurities, and nanofeatures comprising Ti—O and Y.

19. The method of claim 18 wherein the nanostructured ferritic alloy comprises about 5 wt % to about 30 wt % chromium, 0.1 wt % to about 2 wt % titanium, about 0 wt % to about 5 wt % molybdenum, about 0 wt % to about 5 wt % tungsten, about 0 wt % to about 5 wt % manganese, about 0 wt % to about 5 wt % silicon, about 0 wt % to about 2 wt % niobium, about 0 wt % to about 2 wt % aluminum, about 0 wt % to about 8 wt % nickel, about 0 wt % to about 2 wt % tantalum, about 0 wt % to about 0.5 wt % carbon, about 0 wt % to about 0.5 wt % nitrogen, and yttrium oxide, with the balance being iron and incidental impurities.

20. A method of forming a turbomachinery component comprising a nanostructured ferritic alloy, wherein the method comprises vacuum induction melting a ferritic alloy matrix comprising Fe-14Cr-0.4Ti-3W-0.5Mn-0.5Si (wt %) to form a melt of the alloy matrix, atomizing the melt with argon gas to form atomized powder of the ferritic alloy matrix, mixing the atomized powder with yttrium oxide to form a mixed powder, milling the mixed powder until the yttrium oxide is dissolved into the ferritic alloy matrix to form a doped powder, and hot isostatic pressing the doped powder in a vacuum at 30 ksi for 4 hours at 1150° C. to form a hot isostatic pressed nanostructured ferritic alloy turbomachinery component.

21. The method of claim 20 further comprising forging the hot isostatic pressed turbomachinery component.

* * * * *